Aug. 2, 1949.  W. B. EMERY ET AL  2,477,922
MACHINE FOR DEBARKING AND TRIMMING EITHER
STANDING OR FELLED TREE TRUNKS
Filed Sept. 18, 1946  4 Sheets-Sheet 2
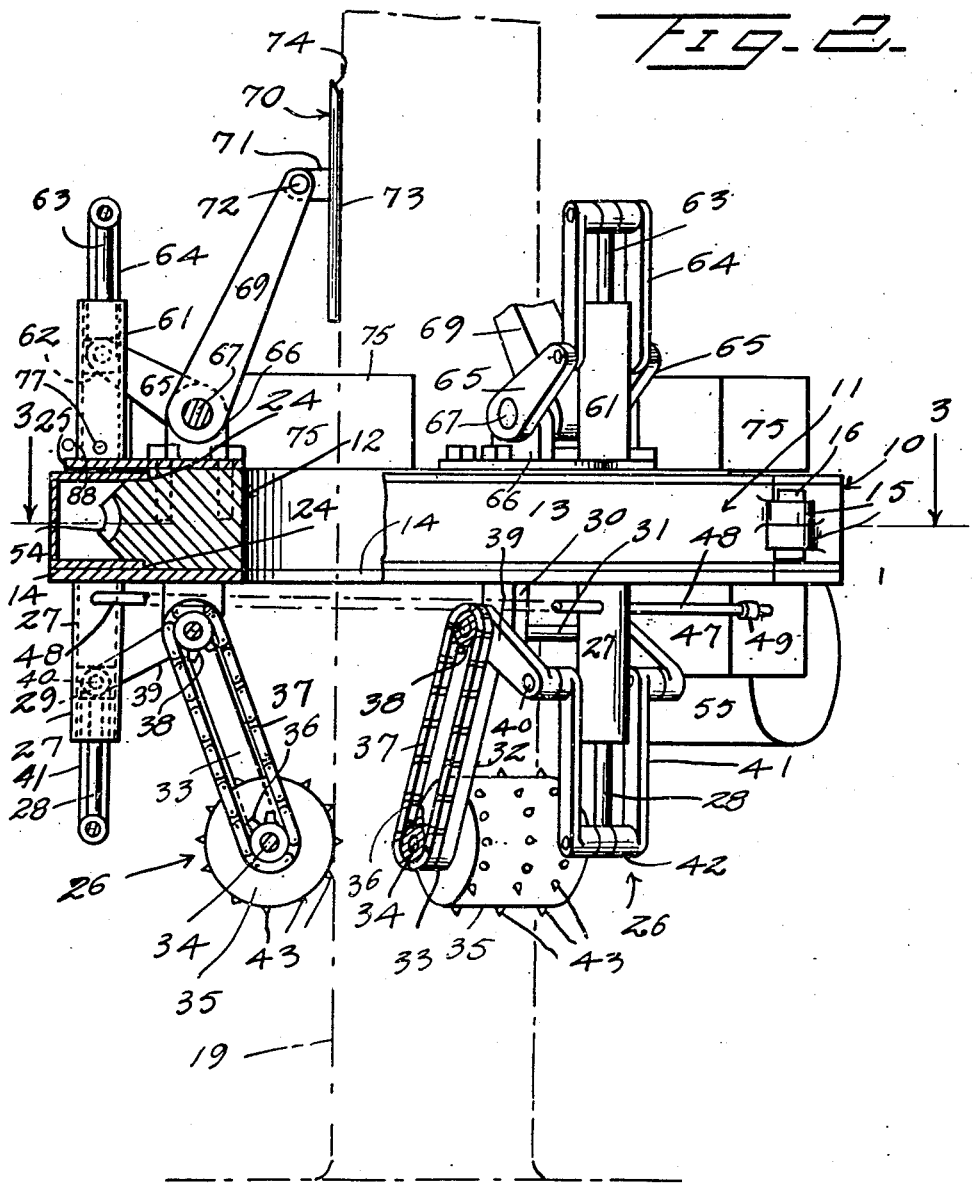
Inventors
Walter B. Emery
Hugh Shuff
By Randolph & Beavers
Attorneys

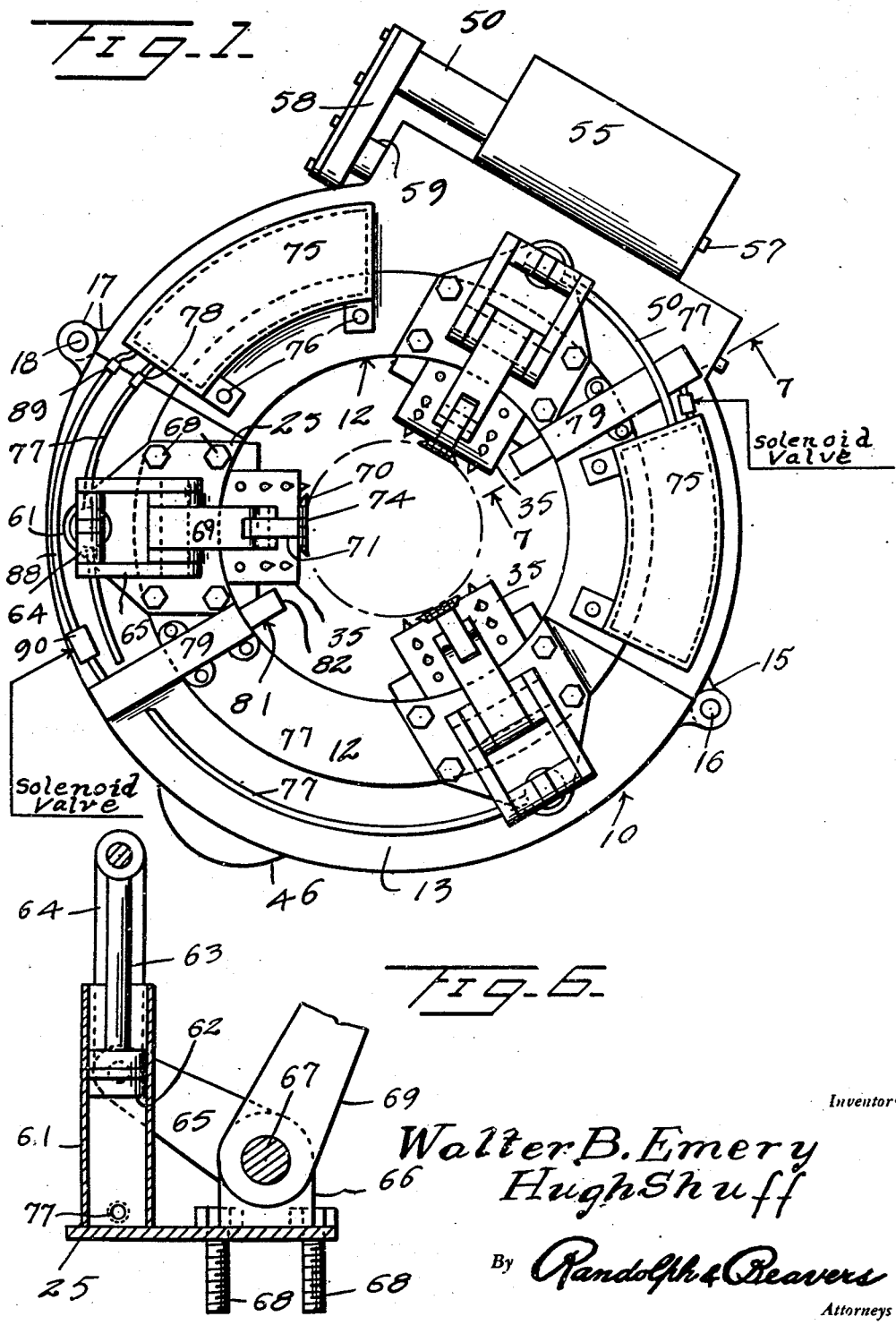

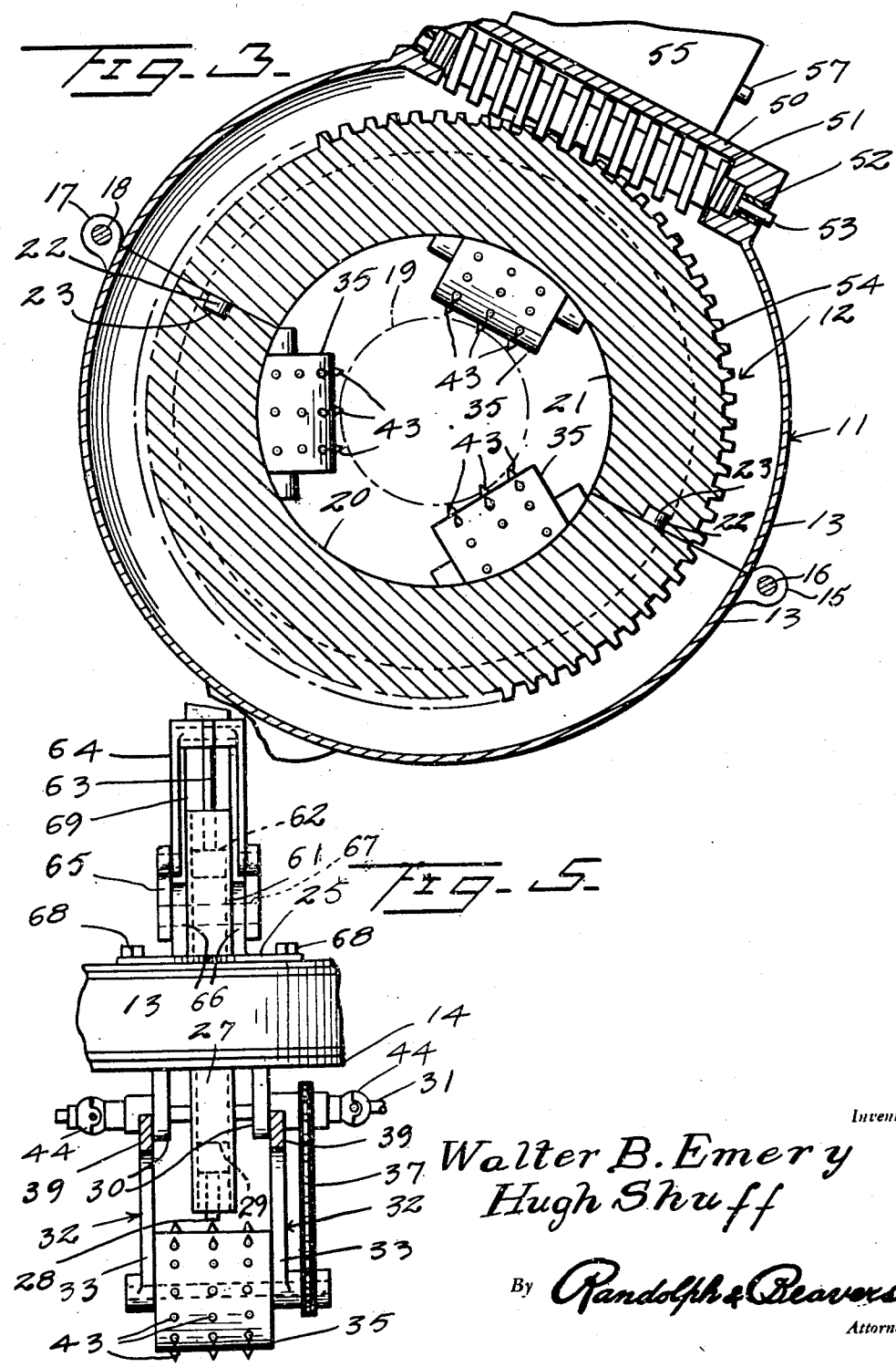

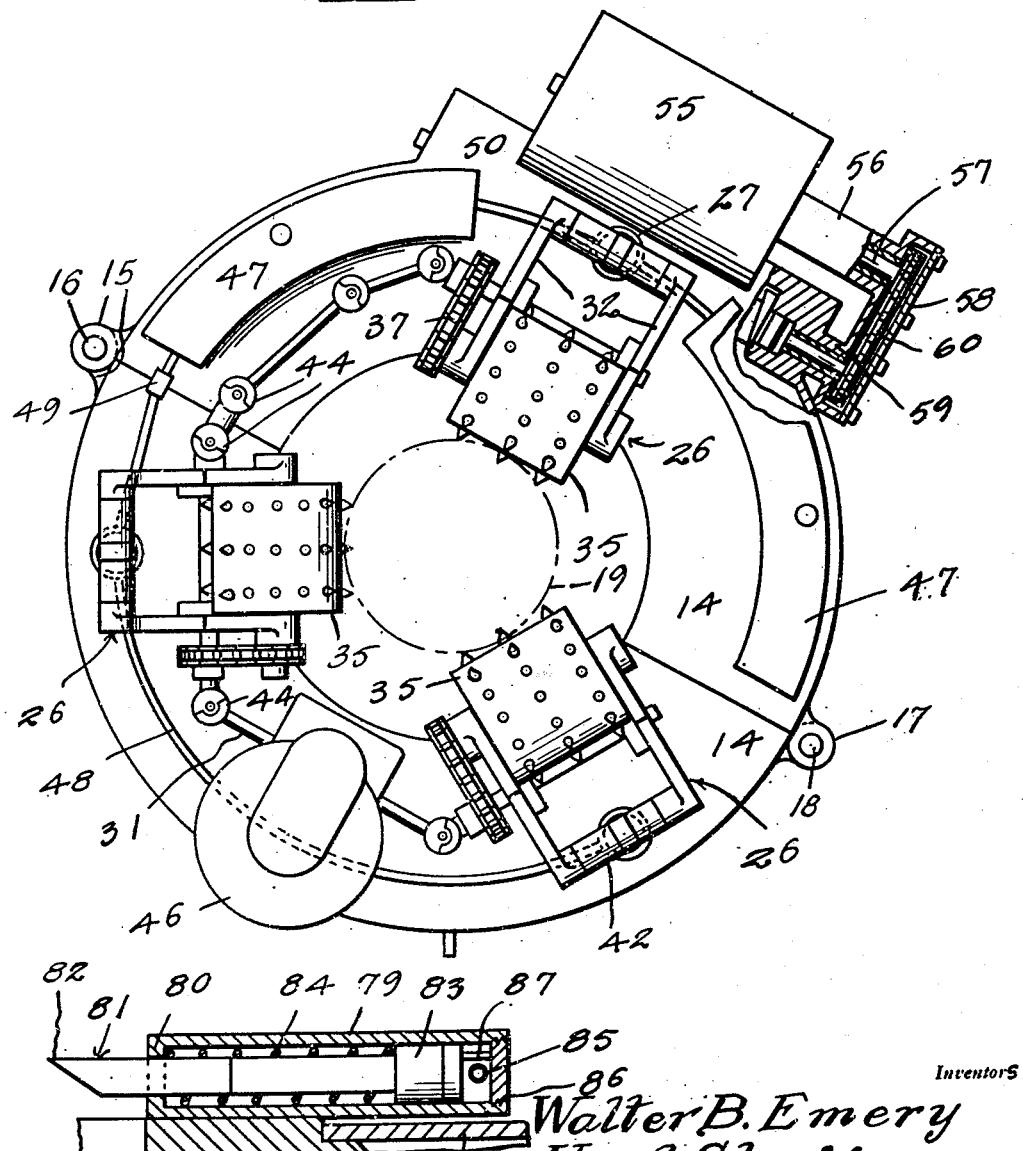

Patented Aug. 2, 1949

2,477,922

UNITED STATES PATENT OFFICE 2,477,922

MACHINE FOR DEBARKING AND TRIMMING EITHER STANDING OR FELLED TREE TRUNKS

Walter B. Emery and Hugh Shuff, Birmingham, Ala.

Application September 18, 1946, Serial No. 697,612

6 Claims. (Cl. 144—208)

1

This invention relates to a machine and method or process for removing bark from standing timber, for trimming off branches and for cutting the standing tree into sections at any desired points.

More particularly, it is an object of the invention to provide a machine having driven means for moving the machine as a unit up and down a tree trunk and including a driven rotatable section on which cutting means are carried for stripping the bark from the tree, trimming off the branches and for cutting the tree into sections.

Another object of the invention is to provide a machine of the aforedescribed character wherein the traction means and the bark stripping and limb trimming means are yieldably held in engagement with the tree trunk to permit said elements to yield in accordance with the contour of the tree trunk.

Still a further object of the invention is to provide a machine formed of sections, and which sections are each separably or hingedly connected to enable the machine to be readily applied to or removed from a tree trunk.

Numerous other objects and advantages of the invention will hereinafter become more fully apparent from the following description of the drawings, illustrating a preferred embodiment thereof, and wherein—

Figure 1 is a top plan view of a preferred embodiment of the bark removing machine;

Figure 2 is a side elevational view, partly in vertical section thereof;

Figure 3 is a horizontal sectional view, through the machine taken substantially along a plane as indicated by the line 3—3 of Figure 2;

Figure 4 is a bottom plan view, partly in section of the machine;

Figure 5 is a fragmentary side elevational view, partly in section of a portion of the machine;

Figure 6 is an enlarged radial sectional view, partly in side elevation of a portion of the machine;

Figure 7 is a longitudinal sectional view of one of the cut-off tools, taken substantially along a plane as indicated by the line 7—7 of Figure 1; and Figure 8 is a fragmentary side elevational view, partly in section, of a portion of a flexible drive shaft of the machine.

Referring more specifically to the drawings, the bark removing machine in its entirety is designated generally 10 and includes generally a base or non-rotating machine section 11 and a rotatable machine section 12.

2

As best seen in Figure 2, the base section 11 includes an annular inwardly opening channel member 13, to the underside of which is secured a relatively wide ring 14 which extends inwardly beyond the inner part of the ring 13. The parts 13 and 14 are formed of substantially semi-circular sections which are provided with aligned apertured lugs 15, connected by a pin 16 to form a hinge joint and corresponding apertured lugs 17 connected by a pin 18 for securing the base section 11 together and in a closed position to form an annular or ring member which is adapted to engage around the trunk of a tree, as indicated in broken lines at 19 in Figure 2.

As best seen in Figures 2 and 3, the rotatable machine section 12 includes a ring gear which is formed from corresponding sections 20 and 21, each of which is semi-circular. The sections 20 and 21 are each provided with a projecting teat 22 at one end thereof and a recess in the opposite end, designated 23. The teats 22 and recesses 23 are arranged to interengage, as seen in Figure 3, for detachably connecting the ring gear sections 20 and 21. The gear 12 is provided with outwardly facing shoulders 24, adjacent its top and bottom surfaces which are arranged to bear against the inner edges of the annular channel members 13 and by means of which the ring sections 20 and 21 are retained in assembled relationship, as seen in Figure 2. The bottom surface of the gear 12 rests upon the inner portion of the annular plate 14 and is supported thereby for rotation in the stationary or base section 11. A plurality of plates 25 are secured to the upper surface of the ring gear 12 and project outwardly therefrom so that the outer portions of the plates 25 overlie the upper portion of the annular channel member 13, as seen in Figure 2.

As best seen in Figure 4, a plurality, preferably three, traction units 26 are supported in depending positions beneath the base section 11 by attachment to the underside of the annular member 14. As seen in Figures 2, 4 and 5, each of the traction units 26 includes a depending compressed air cylinder 27 having an open lower end from which projects a piston rod 28 of a piston 29 which is reciprocally disposed therein. Each of the units 26 also include a pair of apertured lugs 30 which are secured to and depend from the plate 14 and which form a journal for a shaft 31 which extends therethrough. An inverted L-shaped lever 32 is pivotally mounted at its apex on the shaft 31 on the outer side of and adjacent each lug 30. A pair of the levers 32 constitute a part of each of the traction units 26 and the longer arms 33 thereof extend downwardly and are apertured at their lower ends to form journals for the ends of a shaft 34 which extends axially through a traction roller 35 and which is keyed thereto. It will thus be readily apparent that the pair of lever arms 33 combine to journal the traction roller 35 therebetween and one or both ends of the shaft 34 is provided with a chain sprocket 36 over which an endless chain 37 is trained. The chain 37 is trained over a similar sprocket 38 which is keyed to the shaft 31, so that the shaft 34 and roller 35 will be driven by the rotation of the shaft 31. It will be readily apparent that a pulley and belt arrangement or shaft and bevel gear arrangement could be substituted for the sprocket and chain drive as illustrated.

The opposite, shorter arms 39 of the L-shaped levers 32 extend outwardly and are pivotally connected by pins 40 to the ends of a U-shaped yoke 41 which forms a part of the traction unit 26 and which connects the pair of levers 32 thereof together. The outer end of the piston rod 28 is pivotally connected to the intermediate portion 42 of the yoke 41 so that reciprocatory movement of the piston rod 28 will rock the levers 32 to swing the traction rollers 35 of the three traction units 26 toward or away from the tree trunk 19. Each of the traction rollers 35 is provided with outwardly projecting spikes or cleats 43 which are adapted to bite into either the bark or debarked portion of the tree trunk 19 for assuring traction for the machine 10 in its movement up or down the tree trunk, as will hereinafter be explained.

As best seen in Figure 4, the shaft 31 is common to all of the traction units 26 and is provided with a plurality of universal joints 44 to accommodate the various changes in direction which are required in the shaft 31. As seen in Figure 4, the shaft 31 crosses the dividing line between the semi-circular sections of the base 11 at one side only thereof and said portion 45 of the shaft 31, as best seen in Figure 8, is formed by a polygonal-shaped socket and correspondingly shaped projection which are capable of ready separation to enable the sections of the base 11 to be swung to open position for application to or removal from the tree trunk 11.

The plate 14 also supports an electric motor 46 which is secured thereto and depends therefrom and through which a portion of the shaft 31 extends. The shaft 31 is driven by the electric motor 46 for driving the traction rollers 35 as a unit and said motor 46 is of a conventional reversible type for enabling the shaft 31 and traction rollers 35 to be revolved in either direction.

One or a plurality of storage tanks 47 for compressed air are suitably secured to the underside of the plate 14 and are connected by tubular conduits 48 to the cylinders 27, adjacent the upper or closed ends of the latter, so that when air is admitted to the cylinders, the pistons 29 will be forced outwardly for rocking the lever arms 33 inwardly, to thereby move the rollers 35 into engagement with the tree trunk 19 for moving the machine 10 upwardly or downwardly thereon when said traction rollers are revolved in either direction by the electric motor 46. The conduit 48 may be provided with a coupling 49 at the point where it extends across the dividing line of the ring sections to either flexibly or detachably connect the parts on opposite sides thereof.

One section of the annular channel member 13 is provided with an integral enlargement 50 which is substantially tangentially disposed relatively thereto and which forms an inwardly opening housing for a worm 51, contained therein, as best seen in Figure 3. The end portions of the housing 50 are provided with reduced openings 52 forming bearings for journaling the ends of a shaft 53 which is keyed to and projects from the ends of the worm 51. As best seen in Figure 2, the outer portion of the gear 12 is reduced in width and is provided with an annular worm gear toothed portion 54 which meshes with the worm 51 and by means of which the section 12 is revolved by rotation of said worm.

As best illustrated in Figure 4, an electric motor 55 is suitably secured to or formed integral with the outer portion of the housing 50 and depends therefrom. The housing of the motor 55 is provided with a tubular extension 56 at one end thereof, forming a journal or bearing for the driven shaft 57 of the motor 55. The tubular extension 56 is provided with an enlarged head 58 at its outer end which projects laterally therefrom and which is provided with a bearing portion 59 in alignment with one of the bearing portions 52 and through which one end of the shaft 53 extends and in which said end is journaled. The enlargement 58 is provided with a hollow interior containing an endless chain 60 and a pair of sprocket wheels, not shown, keyed to the outer ends of the shafts 53 and 57 and over which the chain 60 is trained for driving the worm shaft 53 from the motor shaft 57 to revolve the worm 51.

A plurality, preferably three, compressed air cylinders 61 are suitably secured to and project upwardly from the plates 25 of the rotatable unit 12. The cylinders 61 are disposed adjacent the outer edge of the plates 25 and in circumferentially spaced relationship and each contains a reciprocating piston 62 having a piston rod 63 projecting upwardly through the upper, open end of its cylinder 61, as best seen in Figure 6. A yoke 64, corresponding to the yokes 41 has its intermediate portion pivotally connected to the upper, free end of the piston rod 63 and has its legs depending downwardly therefrom and pivotally connected at their free ends to corresponding ends of a pair of links 65. A pair of apertured lugs 66 are associated with each cylinder 61 and project upwardly from the plates 25, adjacent its inner edge and form journals for a shaft 67, which extends therethrough. The opposite ends of the links 65 are keyed to the ends of the shaft 67 on the outer sides of the lugs 66. The plate 25 is secured to the upper surface of the inner part of the gear 12 by a plurality of screw fastenings 68. An elongated link 69 has one end disposed between the pair of lugs 66 and keyed to the intermediate portion of the shaft 67 and projects upwardly and inwardly therefrom, substantially at a right angle to the links 65.

A bark stripping and branch trimming cutting blade, designated generally 70 is pivotally mounted on the upper, free end at each of the three links or levers 69 by means of an apertured lug 71 which projects outwardly from the blade of the cutter 70 and which is pivotally connected by a pintle 72 to the free end of its associated link or lever 69. The blade 70 may assume various forms, and in the embodiment as illustrated, includes an elongated blade which is adapted to bear against the tree trunk 19 and longitudinally thereof and one or both longitudinal edges 73 of which is sharpened for peeling the bark from the trunk 19 when the blades 70 are rotated circumferentially around the tree trunk. The blades 70 are preferably each provided with an arcuate or convex upper edge provided with saw teeth 74 for trimming off branches as the machine 10 moves upwardly of the tree trunk and as the section 12 revolves therearound. Numerous other types of blades may be substituted for the blades 70 provided that they are so constructed that they will peel the bark and trim branches from the tree trunk as they are advanced in a helical or spiral movement upwardly thereof. It will be noted that the connection of the blades 70 to the levers 69 by the lugs 71 permits rocking movement of the blades, so that each of said blades may ride over uneven surfaces in the contour of the tree trunk, and the lower ends of the blades will act as guides for urging the toothed upper ends 74 inwardly and into engagement with the tree branches to be removed. As best seen in Figure 1, the machine section 12 is provided with one or a plurality of storage tanks 75 for compressed air which are disposed on the upper side thereof and fixedly secured, preferably to the ring gear thereof by fastenings 76 to rotate with the ring gear unit 12. The storage tanks 75 are connected by conduits 77 to the lower, closed ends of the cylinders 61 for supplying compressed air thereto for forcing the pistons and piston rods 62 and 63 outwardly thereof to rock the links 65 and levers 69 for moving and yieldably retaining the blades 70 in engagement with the tree trunk 19. The conduits 77 are provided with flexible or detachable couplings 78 located over the dividing lines of the semi-circular machine sections.

A pair of radially disposed cylinders 79 are each secured to the upper surface of the gear 12, preferably in diametrically opposed relationship and each of said cylinders 79 is provided with a restricted opening 80 in its inner end for reciprocally receiving a cutter tool 81 having a cutting edge 82 projecting outwardly therefrom and toward the tree trunk 19. Each tool 81 is provided with an enlarged head 83 at its inner end which is slidably received in the cylinder 79 and against which bears an expansion coil spring 84 which seats against the inner end of the cylinder 79 and which tends to bias the cutting tool 81 toward a retracted position within the cylinder 79. The cylinder 79, adjacent its outer end is provided with an opening 85 and the outer end thereof is closed by a plug 86 which is threadedly engaged therein and provided with an inwardly projecting lug 87 to limit the inward movement of the tool head 83 to prevent it from closing the inlet ports 85. The inlet ports 85 are connected to the storage tank or tanks 75 by conduits 88 having flexible or detachable couplings 89 for the same purpose as the couplings 78. The conduits 88, between the cylinders 79 and the storage tanks 75 are provided with solenoid valves 90 which normally function to bleed the cylinders 79 to the atmosphere, but which, when energized, permit the passage of compressed air from the storage tank or tanks 75 to the cylinders 79 for projecting the cutter tools 81 so that the cutting edges 82 thereof will be brought into engagement with the tree trunk 19. Both of the cylinders 79 may be connected by a single conduit to one of the storage tanks 75 in which case a single solenoid valve will be required or if the cylinders 79 are connected by separate conduits 88 to separate storage tanks 75, a separate solenoid valve will be utilized in each conduit 88, in which case both solenoid valves will be actuated as a unit by a conventional electric circuit.

From the foregoing it will be readily apparent that the machine 10 may be readily assembled around the tree trunk 19, adjacent the base thereof and with the storage tanks 47 and 75 charged with compressed air and connected to the cylinders 27 and 61, respectively, air of a predetermined pressure is admitted to said cylinders for moving the traction rollers 35 and blades 70, respectively, into engagement with the tree trunk 19. The storage tanks 47 and 75 are of sufficient capacity to maintain the required pressure in the cylinders 27 and 61 for one complete cycle of operation of the machine 10. The electric motors 46 and 55 and the solenoid valves 90 are connected to a suitable source of electric current, not shown, by electrical conductors, not shown, of sufficient length to accommodate the movement of the machine 10 to its required height on the tree trunk 19. Suitable electric switches are provided for energizing and deenergizing the electric motors 46 and 55 and the solenoid valves 90 and for reversing the direction in which the electric motor 46 is driven. The switches or controls may be located adjacent the source of electric current, for example, at the base of the tree trunk 19 and convenient to the operator of the machine 10. Assuming that the switches or controls are set to cause the motor 46 to be driven in a direction, so that the traction rollers 35 will move upwardly of the tree trunk and further assuming that the electric motor 55 is energized for revolving the machine unit 12 through the worm 51 and worm gear 54, as previously described, the machine 10 will be caused to move upwardly of the tree trunk 19 at any desired speed with the machine section 12 revolving within the machine section 11 so that the cutting edges 73 of the blades 70 will be revolved in a helical or spiral movement around the tree trunk for peeling the bark therefrom and so that the saw tooth edges 74 will trim off the branches of the tree. During this upward movement of the machine 10, the solenoid valves 90 are deenergized to retain the cutter tools 81 in retracted positions out of engagement with the tree trunk 19. When the bark has been peeled off to the required height, the electric motor 46 is reversed to drive the shaft 31 in the opposite direction so that the traction rollers 35 will be driven in the opposite direction to cause the machine 10 to move downwardly of the tree trunk. At predetermined locations of the machine 10 on the tree trunk 19, the motor 46 can be deenergized for rendering the machine 10 stationary as to longitudinal movement on the tree trunk and with the motor 55 energized for revolving machine section 12, the solenoid valves 90 may be energized for projecting the cutter tools 81 so that the cutting edges 82 thereof will execute a circular cut to cut off the tree trunk at any elevation desired. It will be readily apparent that this operation may be repeated for cutting the tree trunk from top to bottom in a plurality of sections.

Various modifications and changes are contemplated and may obviously be resorted to, without departing from the spirit and scope of the invention as hereinafter defined by the appended claims.

We claim:

1. In a machine of the character described, an annular machine section formed of separable semi-annular portions adapted to be detachably positioned about a standing tree trunk, an annular rotatable machine section formed of separable semi-annular portions supported by the first mentioned machine section and detachably positioned around the tree trunk, driven traction means carried by the first mentioned machine section for engagement with the tree trunk for moving the machine upwardly and downwardly thereof, adjustable cutter means carried by the rotatable machine section for engagement with the tree trunk and having cutting edges extending longitudinally and circumferentially of the tree for peeling the bark therefrom and for trimming off branches, respectively, and driven means for revolving said rotatable section relatively to the first mentioned section and as the machine is moved lengthwise of the tree trunk for simultaneously peeling the bark and trimming the branches of the trunk.

2. A machine as in claim 1, said traction means including driven rollers for engagement with the tree trunk and yieldable actuating means for retaining said rollers in engagement with the trunk.

3. A machine as in claim 1, said traction means including a plurality of rollers, levers pivotally supported by the machine, said rollers being journaled in said levers, and actuating means bearing on said levers for rocking them in a direction to urge the rollers into engagement with the tree trunk.

4. A machine as in claim 1, said bark peeling and limb trimming means including a plurality of cutting blades, levers pivotally supported by said machine and on which said blades are pivotally mounted and yieldable means bearing on said levers for urging the blades into yieldable engagement with the tree trunk.

5. In a machine of the character described, an annular machine frame formed of separable sections adapted to be disposed detachably around a tree trunk and supported thereby, an annular rotatable machine unit formed of separable sections rotatably supported in said frame, means for revolving said unit relatively to the frame, bark stripping cutters carried by said unit for engagement with the tree trunk and having cutting edges extending longitudinally of the trunk, and driven traction means carried by the machine frame for engagement with the tree trunk for moving the machine lengthwise thereof for causing the bark stripping cutters to execute a helical stripping operation of the bark, said bark stripping cutters also including cutting edges disposed circumferentially of the trunk for trimming off branches from the tree trunk in advance of the machine.

6. In a machine of the character described, an annular machine frame formed of separable sections adapted to be disposed detachably around a standing tree trunk and supported thereby, an annular rotatable machine unit formed of separable sections rotatably supported in said frame, means for revolving said unit relatively to the frame, bark stripping cutters carried by said unit for engagement with the tree trunk and having cutting edges extending longitudinally of the trunk, and driven traction means carried by the machine frame for engagement with the tree trunk for moving the machine lengthwise thereof for causing the bark stripping cutters to execute a helical stripping operation of the bark, a plurality of lever members pivotally mounted on the machine and connected to the traction means and bark stripping cutters for swingably supporting said parts relatively to the machine and to the tree trunk, and fluid pressure operated means mounted on said frame sections and bearing on said levers for yieldably retaining the traction means and bark stripping means in engagement with the tree trunk.

WALTER B. EMERY.
HUGH SHUFF.

REFERENCES CITED

The following references are of record in the file of this patent:

UNITED STATES PATENTS

| Number | Name | Date |
|---|---|---|
| 397,114 | Dolsen | Feb. 5, 1889 |
| 707,428 | Kidder | Aug. 19, 1902 |
| 739,495 | Kidder | Sept. 22, 1903 |
| 742,447 | Kidder | Oct. 27, 1903 |
| 1,243,294 | Hruska | Oct. 16, 1917 |
| 1,299,289 | Berg | Apr. 1, 1919 |
| 1,957,792 | McManis | May 8, 1934 |
| 2,109,414 | Deiters et al. | Feb. 22, 1938 |
| 2,174,525 | Padernal | Oct. 3, 1939 |

FOREIGN PATENTS

| Number | Country | Date |
|---|---|---|
| 12,282 | Great Britain | Aug. 25, 1888 |
| 722,254 | France | Dec. 28, 1931 |